United States Patent [19]

Kronies

[11] 4,410,944
[45] Oct. 18, 1983

[54] APPARATUS AND METHOD FOR MAINTAINING CACHE MEMORY INTEGRITY IN A SHARED MEMORY ENVIRONMENT

[75] Inventor: Reinhard K. Kronies, Fountain Valley, Calif.

[73] Assignee: Burroughs Corporation, Detroit, Mich.

[21] Appl. No.: 247,214

[22] Filed: Mar. 24, 1981

[51] Int. Cl.³ .............................................. G06F 13/00
[52] U.S. Cl. .................................... 364/200; 364/134
[58] Field of Search ... 364/200 MS File, 900 MS File, 364/401, 134

[56] References Cited

U.S. PATENT DOCUMENTS

| | | | |
|---|---|---|---|
| 3,566,358 | 2/1971 | Hasbrouck | 364/200 |
| 3,581,291 | 5/1971 | Iwamoto et al. | 364/200 |
| 3,723,976 | 3/1973 | Alvarez et al. | 364/200 |
| 3,735,360 | 5/1973 | Anderson et al. | 364/200 |
| 3,771,137 | 11/1973 | Barner et al. | 364/200 |
| 3,845,474 | 10/1974 | Lange et al. | 364/200 |
| 3,848,234 | 11/1974 | MacDonald | 364/200 |
| 4,056,844 | 11/1977 | Izumi | 364/200 |
| 4,075,686 | 2/1978 | Calle et al. | 364/200 |
| 4,078,254 | 3/1978 | Beausoleil et al. | 364/900 |
| 4,096,567 | 6/1978 | Millard et al. | 364/200 |
| 4,161,024 | 7/1979 | Joyce et al. | 364/200 |
| 4,181,935 | 1/1980 | Feeser et al. | 364/200 |
| 4,181,937 | 1/1980 | Hattori et al. | 364/200 |
| 4,228,503 | 10/1980 | Waite et al. | 364/200 |
| 4,313,161 | 1/1982 | Hardin et al. | 364/200 |
| 4,322,795 | 3/1982 | Lange et al. | 364/200 |
| 4,345,309 | 8/1982 | Arulpragasam et al. | 364/200 |

OTHER PUBLICATIONS

IBM Tech. Discl. Bull., vol. 15, No. 11, Apr. 1973, pp. 3463-3464, "Attached Support Processor w/Shared Cache and Execution Unit", by Schmookler.
IBM Tech. Discl. Bull., vol. 21, No. 6, Nov. 1978, pp. 2468-2469, "Data Processing System w/Second Level Cache", by F. J. Sparacio.

*Primary Examiner*—Mark E. Nusbaum
*Assistant Examiner*—William G. Niessen
*Attorney, Agent, or Firm*—Nathan Cass; Kevin R. Peterson; David G. Rasmussen

[57] ABSTRACT

A data processing system having a plurality of processors and a plurality of dedicated and shared memory modules. Each processor includes a cache for speeding up data transfers between the processor and its dedicated memory and also between the processor and one or more shared memories. The integrity of the data in each cache with respect to the shared memory modules is maintained by providing each shared memory with a cache monitoring and control capability which monitors processor reading and writing requests and, in response to this monitoring, maintains an accurate, updatable record of the data addresses in each cache while also providing for invalidating data in a cache when it is no longer valid.

6 Claims, 4 Drawing Figures

APPARATUS AND METHOD FOR MAINTAINING CACHE MEMORY INTEGRITY IN A SHARED MEMORY ENVIRONMENT

BACKGROUND OF THE INVENTION

The present invention relates to improved means and methods for accessing data from a memory in a digital data processing system. More particularly, the present invention relates to memory accessing apparatus of the type employing one or more cache memories.

As is well known, a cache memory (cache) is a small, relatively fast access memory which is interposed between a larger, relatively slow access memory to improve effective data transfer rates. Typically, a cache implementation is such that its existence is essentially hidden and appears transparent to the user. Also, a cache typically provides for automatically removing old data in order to accommodate new, more likely to be used data when the cache is full. This removal of data may, for example, be on the basis of removing the least recently used data in the cache.

In a typical data processing system, a plurality of memory modules are provided for accessing by a plurality of requestors. A requestor, for example, may be a processor. Such a system is typically constructed and arranged so that a particular dedicated memory module (local memory module) is provided for use by each requestor, while one or more additional memory modules (shared memory modules) are provided for shared use by a plurality of requestors. Each requestor is typically provided with a cache for use with its local memory module for speeding up the accessing of data therefrom. However, these caches are not used for accessing the shared memory modules, since, when a memory is shared by more than one requestor, it is possible that a requestor will write different data into an address which is the same as an address of data currently stored in the cache of a different requestor, thereby destroying that cache's integrity relative to the shared memory. It will be understood that such a situation could result in the occurrence of serious errors which would be most difficult to diagnose.

SUMMARY OF THE PRESENT INVENTION

In the light of the foregoing background description, a broad object of the present invention is to provide improved means and methods for employing a cache in a data processing system so as to permit its use with a shared memory.

A more specific object of the invention is to provide improvements in a data processing system of the type employing a plurality of memory modules and a plurality of requestors such that a cache assigned to a particular requestor can be used for speeding up data transfers from one or more memory modules which are shared in common with one or more other requestors.

Another object of the invention is to provide a system in accordance with the foregoing objects which permits a cache assigned to a particular requestor to be used for speeding up transfers from one or more shared memory modules as well as from a dedicated local memory module.

An additional object of the invention is to provide improved means and methods for maintaining the integrity of data stored in a cache.

In a particular exemplary embodiment of the invention, a data processing system is provided having a plurality of memory modules and a plurality of processors. Certain ones of these memory modules function as local memories and are dedicated to respective ones of the processors, while other memory modules are to be shared in common by a plurality of processors.

In the preferred embodiment, each processor includes a cache which serves to speed up data transfers from the processor's local memory as well as from the shared memory modules. In order to maintain the integrity of each processor's cache, each shared memory module is provided with a cache monitoring and control capability. This cache monitoring and control capability serves to monitor the data read and write requests from each processor and, in response to this monitoring, to maintain an accurate updatable record of the addresses of the data currently stored in each cache, and to also provide for invalidating particular data in a cache when this data is no longer valid.

The specific nature of the invention as well as other objects, features, advantages and uses thereof will become readily apparent from the following detailed description and the accompanying drawings.

DETAILED DESCRIPTION

Like characters and numerals refer to like elements throughout the figures of the drawings.

Figure 1:
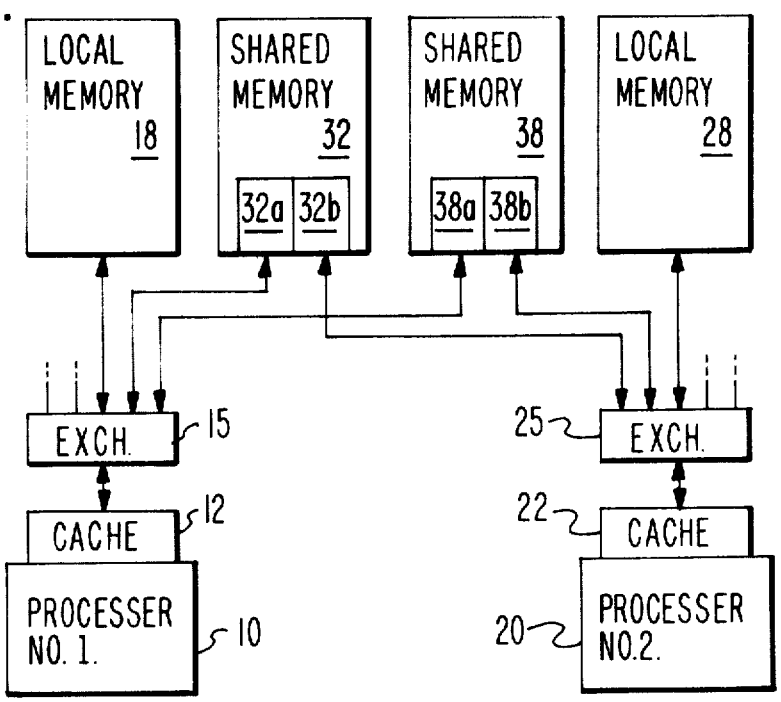
FIG. 1 is a block diagram of a data processing system incorporating the present invention.

Referring initially to FIG. 1, illustrated therein is a data processing system employing two processors 10 and 20 and four memory modules 18, 28, 32 and 38. Memory module 18 serves as a local memory for processor 10, while memory module 28 serves as a local memory for processor 20. Memory modules 32 and 38 serve as shared memories for both of processors 10 and 20. It is to be understood that additional processors and memories could be provided in accordance with the invention.

As indicated in FIG. 1, each of processors 10 and 20 includes a respective cache 12 or 22 and a respective memory exchange 15 or 25 which cooperate with their respective local memory 18 or 28 for speeding up data transfers therefrom in a known manner. For example, see the commonly assigned U.S. Pat. No. 4,181,935, issued Jan. 1, 1980, W. E. Feeser and Mark L. C. Gerhold, the contents of which are to be considered as incorporated herein.

Each cache 12 and 22 also serves as a cache for data transfers from the shared memories 32 and 38. In order to make sure that the integrity of each cache is maintained, each of shared memories 32 and 38 is provided with monitoring and control circuitry, one for each processor which is sharing the memory. Accordingly, as indicated in FIG. 1, the shared memory 32 includes monitoring and control circuitry 32a and 32b for use with caches 12 and 22, respectively, and shared memory 38 likewise includes monitoring and control circuitry 38a and 38b for use with caches 12 and 22, respectively.

Figure 3:
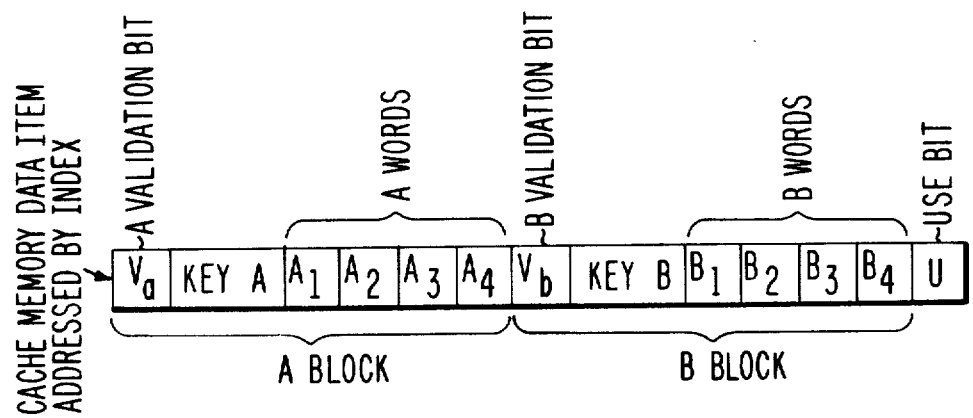
FIG. 3 illustrates the format of a typical data item stored in the cache memory of FIG. 2.
Figure 2:
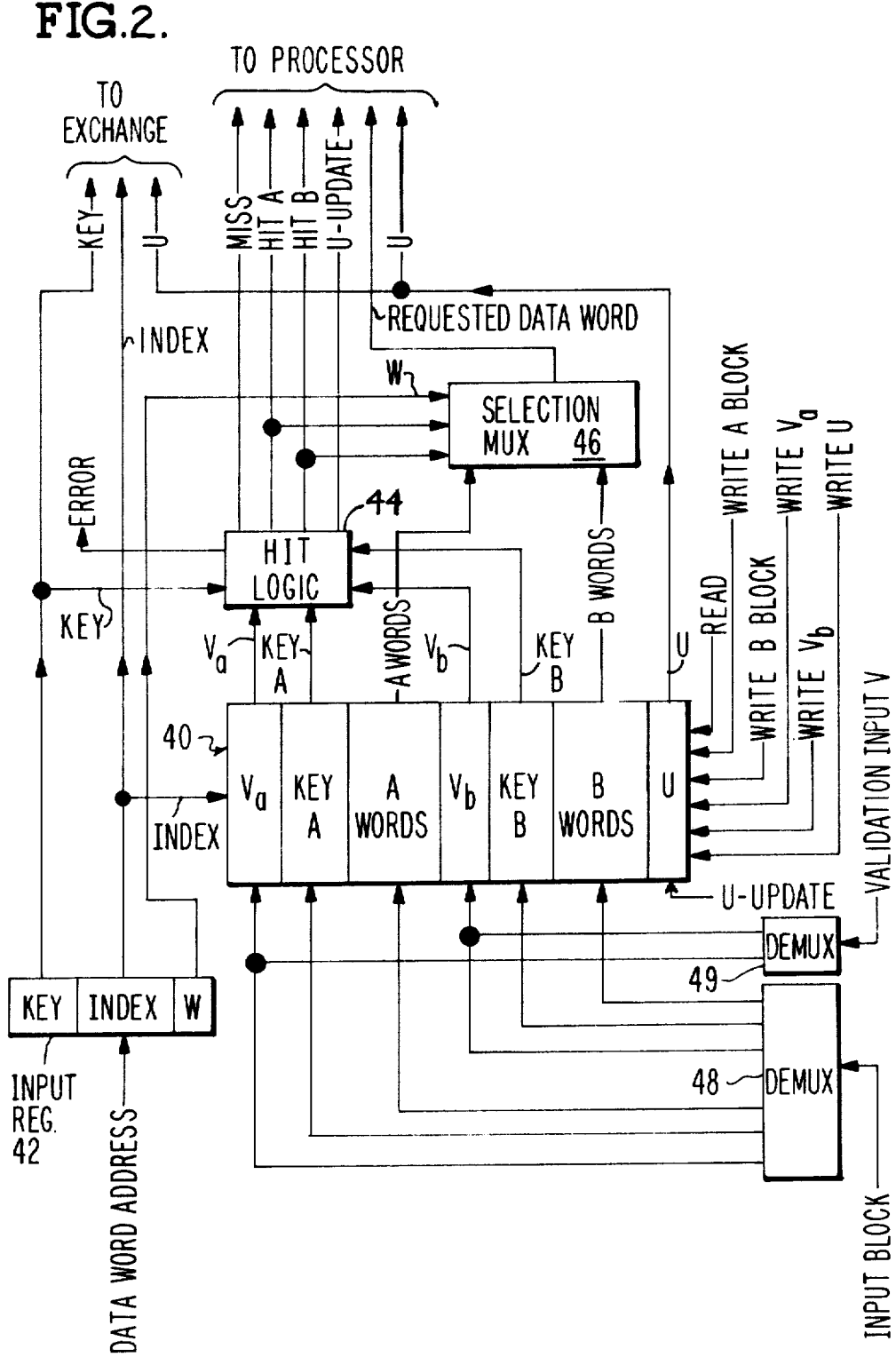
FIG. 2 is an electrical block diagram illustrating the construction and arrangement of each cache employed in the system of FIG. 1.

Reference is now directed to FIGS. 2 and 3 which will be used to describe the construction and operation of the particular type of cache employed in accordance with the invention for each of the caches 12 and 22 in FIG. 1.

As illustrated in FIG. 2, the cache includes a random access memory 40 and an associated input register 42 containing an index field which is used to address a particular one of, for example, 256 addressable locations provided within memory 40. Each addressable location in memory 40 contains a memory data item of the type illustrated in FIG. 3 and comprised of: (1) an A-block containing an A-key, four data words $A_1$, $A_2$, $A_3$ and $A_4$, and a validation bit $V_a$; (2) a B-block containing a B-key, four data words $B_1$, $B_2$, $B_3$ and $B_4$, and a validation bit $V_b$; and (3) a use field U (which may be a single bit) indicating which of blocks A or B was least recently used. It is to be understood that additional blocks and different numbers of words within each block could be provided for each memory data item. Of course, if additional blocks are provided, the U field and its generation would have to be adapted accordingly, which can be done in a well known manner.

The cache illustrated in FIG. 2 operates during both read and write operations of its respective processor. Operation during a processor read operation will be considered first.

For a processor read operation, the processor first places the address of the desired data word to be read in the input register 42. As indicated in FIG. 2, this data word address in register 42 comprises a key field, an index field and a word selection field W. The processor then activates the READ input to memory 40 which causes the memory data item at the address designated by the index field in register 42 to be read out. This selected data item has the format shown in FIG. 3.

As indicated in FIG. 2, the A key and B key fields and the validation bits $V_a$ and $V_b$ of the selected data item read out from memory 40 are applied to hit logic 44 which also receives the key field from the input register 42. Hit logic 44 compares the key field from input register 42 with each of keys A and B of the selected data item in order to determine whether the data word identified by the address in the input register 42 is contained as one of the four words in the respective A or B block. If no match occurs for either key comparison, or if a match occurs but the respective validation bit $V_a$ or $V_b$ is "0" (indicating invalid data), then a "1" (or true) miss signal output is provided from hit logic 44. If a match occurs for only one of the A and B keys and the respective validation bit $V_a$ or $V_b$ is "1" (indicating valid data), then the respective hit A or hit B output of hit logic 44 will become "1" (or true) to thereby indicate that one of the four words in the respective A or B block is the data word requested by the address in the input register 42. In such a case, a "1" or "0" U-update signal is also provided at the output of hit logic 44 for use in updating the U bit of the respective data item to indicate which block was least recently used.

If a match is obtained for both key A and key B, there are several possibilities for the outputs of hit logic 44 depending upon the states of the respective validation bits $V_a$ and $V_b$. If both of the respective validation bits $V_a$ and $V_b$ are "0" (indicating invalid data in both A and B blocks), then only a "1" miss output is provided by hit logic 44. However, if both of the respective validation bits $V_a$ and $V_b$ are "1", then a "1" error output as well as a "1" miss output is provided from hit logic 44, since a valid match of both keys in a data item should not occur.

Finally, if a match is obtained for both of keys A and B and only one of the respective validation bits $V_a$ and $V_b$ is "1", then a "1" hit output is provided only for the valid key just as if it were the only one which produced a match (as described in the previous paragraph). In other words, a match is ignored for a key if its respective validation bit is "0" indicating invalid data in the respective block.

Still with reference to FIG. 2, the hit A and hit B outputs of hit logic 44 and the select word field W from the input register 42 are applied as selection inputs to a selection multiplexer 46 for selecting the particular requested data word from the A and B words of the selected data item which are applied as inputs to the selection multiplexer 46. Accordingly, the particular hit A or hit B input which is "1" selects the respective group of A or B words and W selects the particular one of these four words for outputing by the selection multiplexer 46.

The cache of FIG. 2 is controlled by its respective processor so that, following the above described processor read operation, a particular one or more of the write operations indicated at the right side of memory 40 in FIG. 2 are activated, depending upon the results indicated by the outputs of the hit logic 44. If a miss is indicated, the processor uses the key and index fields in the input register 42 to address (via the respective exchange 15 or 25 in FIG. 1) the particular memory (designated by the processor) which stores the block containing the requested data word. When this block arrives at the processor, the processor activates either the WRITE A BLOCK or WRITE B BLOCK input to the memory 40. This causes the arriving block, which is applied to demultiplexer 48 in FIG. 2, to be written into the least recently used block A or block B (as indicated by the value of the U bit) of the data item at the address indicated by the index field in the input register 42. For example, if U has a value of "1", which indicates that block A is the least recently used block, then the arriving block would be written into block A. The validity bit $V_a$ of the input block is written as a "1" since the data words in an arriving block are assumed to be valid.

If a hit A or hit B indication is provided from the hit logic 44 in FIG. 2, the processor will activate the WRITE U input to cause the U-update output of the hit logic 44 to be written into the U bit of the data item at the address indicated by the index field in the input register 42. For example, if a hit A indication is provided at the output of the hit logic 44, then the U-update output of the hit logic 44 will be "0" to indicate that block B is the least recently used block, and it is this "0" value of U which will be written into the U bit of the data item at the address indicated by the index field in register 42.

If an error is indicated at the output of the hit logic 44, then no write memory operations are initiated and the processor is signalled to take appropriate corrective action.

Having considered how the cache illustrated in FIG. 2 operates during a processor read operation, cache operation during a processor write operation will now be considered. It will be understood, of course, that these cache operations to be described are in addition to the usual processor write operations involving writing into a designated memory module via its respective exchange (FIG. 1).

During a processor write operation, the processor places index and key fields in the input register 42 which also serves as the address used to access a corresponding location in the memory module in which the block is to be written. The processor also causes the READ input to become activated, causing a selected data item to be read out from the memory 40 just as occurs during a read processor operation. However, during a processor write operation, only the key A and key B portions of the selected data item are used. These key A and key B outputs are applied to hit logic 44 to determine whether the data item addressed by the index field of register 42 contains the block designated by the key field in the input register 42. If hit logic 44 produces a "1" miss output signal, wich indicates that a valid form of the addressed block is not in the cache, then the cache does nothing further. However, if a "1" is produced for either a hit A or a hit B output of hit logic 44, which indicates that the addressed block is contained in the selected data item (and is valid), then the processor causes the corresponding WRITE A BLOCK or WRITE B BLOCK input to the memory 40 to be activated. Also, the processor applies the new block which is to be written to the memory 40 via the demultiplexer 48 in FIG. 2, thereby causing this new block to be written into the appropriate A or B block of the data item designated by the index field in register 42. The validity bit of the new block has a "1" value since the data words are assumed to be valid. Thus, the data words contained in this A or B block in the cache will correctly correspond to the data words stored at the same index-key address in the designated memory module in which the block is to be written.

As indicated in FIG. 2, the cache memory 40 is also provided with WRITE $V_a$ and WRITE $V_b$ inputs along with a validation input V applied to memory 40 via a demultiplexer 49 to permit the validation bit $V_a$ or $V_b$ of a selected block to be set to "0" (cleared) so as to in effect invalidate the data words contained in that block.

Figure 4:
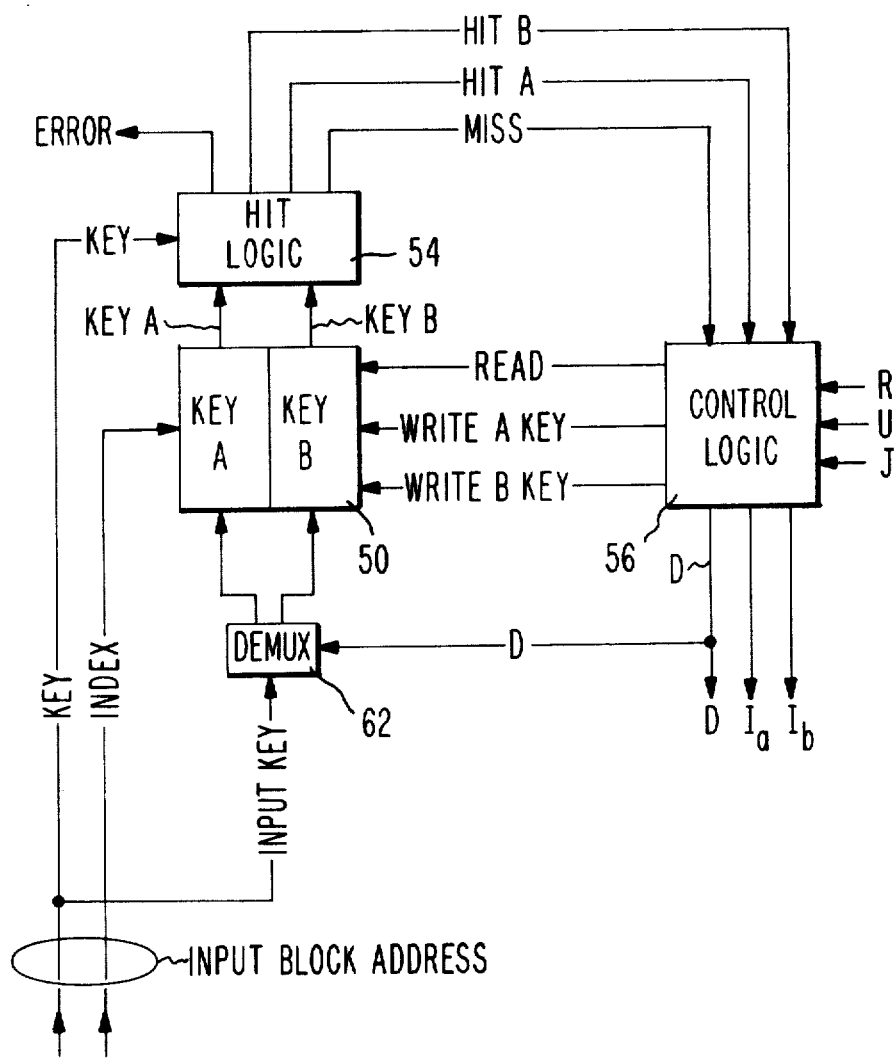
FIG. 4 is a preferred implementation of the cache monitoring and control circuitry employed within each shared memory in FIG. 1 for maintaining the integrity of each cache cooperating therewith.

Having described the basic construction and operation of the cache illustrated in FIG. 2, reference is next directed to FIG. 4 which illustrates a preferred implementation of the cache monitoring and control circuitry employed within each shared memory 32 and 38 in FIG. 1 for each of the portions 32a, 32b, 38a and 38b in FIG. 1 in accordance with the invention. It will be remembered that the purpose of each of the cache monitoring and control circuitry 32a, 32b, 38a and 38b in FIG. 1 is to monitor read and write requests from its respective processor and, in response thereto, to maintain an accurate updatable record of the data in the respective cache, while also providing for invalidating a block of data in the respective cache when it is no longer valid because the block of data in a corresponding address of the shared memory has been changed by another processor.

As shown in FIG. 4, the cache monitoring and control circuitry illustrated therein includes an address table memory 50 which provides an updatable record of the addresses of the particular blocks stored in the respective cache which correspond to like block addresses in the shared memory. It will be understood that this address table memory 50 may be provided as part of the shared memory. The address table memory 50 comprises A key and B key pairs organized in a similar manner to the data items in the cache memory 40 in FIG. 2 and are likewise addressed by the index field. More specifically, the address table memory 50 in FIG. 4 provides for the storage of key fields in A and B pairs, each pair being selected in response to an applied index field. Thus, each pair of A and B keys stored in the address table memory 50 in FIG. 4 directly corresponds to the A and B keys stored in the A and B blocks of a data item having the same index field address in the cache memory 40 in FIG. 2.

As illustrated in FIG. 4, hit logic 54 is provided, which is basically similar to hit logic 44 in FIG. 2, except that no validation bit inputs are provided, since all key pairs in table memory 50 are assumed to be valid. Accordingly, hit logic 54 operates similarly to hit logic 44 in FIG. 2 (with both $V_a$ and $V_b$ assumed to be "1") so as to provide corresponding "1" or "0" hit A, hit B, miss or error outputs depending on the results of comparing the key field of an applied address with a key A and key B fields selected from the address table memory 50 in response to an applied index field. These outputs from hit logic 54 are applied to control logic 56 along with various other signals U, R, and J (to be considered shortly) for use in updating the table address memory 50 with a new key field via demultiplexer 62. Control logic 56 also provides outputs D, $I_a$ and $I_b$ for use in maintaining the integrity of the data stored in the address table memory 50 and in the respective cache, as will shortly become evident.

The construction and arrangement of the cache monitoring and control circuitry illustrated in FIG. 4 (and representing one of the shared memory portions 32a, 32b, 38a or 38b in FIG. 1) will become clearly evident from the representative operative descriptions which will now be provided.

The first type of operation to be considered with respect to FIG. 4 is a normal processor read operation request which is sent to a shared memory (via the respective exchange) to obtain a block of data which the processor failed to find in its respective cache (that is, a miss was produced). This processor read operation request includes the following: a block address comprising an index field and a key field; an R signal having a "1" or "0" value wherein a "1" indicates that a processor read operation is being requested; and a "1" or "0" use bit U (derived from the cache) indicating whether the A or B block in the cache memory 40 (FIG. 2) is the least recently used block.

The block address constituted by the index and key fields and the R signal are used in a conventional manner to read out the corresponding block from the shared memory. This block is then sent to the processor which requested the block via its respective exchange (see FIG. 1). The manner in which this block is stored in the cache of the requesting processor has already been described in connection with FIG. 2.

In addition to these reading and sending operations occurring in response to a processor read request, the particular monitoring and control means in the shared memory corresponding to the cache of the requesting processor (FIG. 4) uses the input key and index fields, the R signal and the U bit provided by the requesting processor to update the cache address table memory 50. This is accomplished as a result of the control logic 56 responding to a "1" value of R (processor read request) to cause the WRITE input to memory 50 to be activated, and responding to the "1" or "0" value of U to cause either the WRITE A KEY or the WRITE B KEY input to be activated. With the address table memory 50 thus activated, the input key field is written into the memory 50 via demultiplexer 62 at the appropriate key A or key B location (determined by the value of U) of the key pair of selected by the index field. Thus, the respective cache address table 50 (FIG. 4) in the shared memory will thereby remain in correct correspondence with its respective cache memory.

A processor write request to a shared memory will next be considered. It will be remembered that, if the processor's cache produces a miss in response to the write address, then the processor leaves the cache unchanged; however, if the write block address produces a hit A or hit B output, then the processor writes the new block into the particular A or B block of the data item selected by the index field for which a hit was obtained. In either of the above cases, no change need be made in the address table memory 50 (FIG. 4) of the respective cache monitoring and control circuitry in the shared memory in which the new block is to be written. The reason why no change is needed is: (a) if the requested block is not in the processor's cache, its corresponding key will then also not be in the respective address table memory 50 and thus no updating of the address table memory 50 is required; and (b) if on the other hand the processor's cache produces a hit, updating will still not be required since the key will already be in the address table memory 50, and furthermore, when the new block is written into the shared memory at the address indicated by the key and index fields, the particular block in the cache represented by this key in the address table memory 50 will then correctly correspond to this new block stored in the shared memory.

The final operative situation that needs to be considered is how the cache monitoring and control circuitry of FIG. 4 handles the situation where a processor write request arrives at the shared memory from a different processor from that to which the monitoring and control circuitry corresponds. For example, with reference to FIG. 1, assume that processor 20 sends a processor write request (via exchange 25) to the shared memory 32. Since the monitoring and control circuitry indicated at 32b in the shared memory 32 in FIG. 4 is the one which is provided for cooperation with processor 20, it need not take any updating action in response to the processor write request from processor 20 for the reasons set forth in the previous paragraph. However, the other monitoring and control circuitry 32a in the shared memory will have to take action if the write request from processor 20 designates a block address which is the same as that contained in the cache 12 of processor 10. The reason for this is that, when the block at this address in the shared memory 32 is changed by the write request from processor 20, the block in cache 12 of processor 10 will no longer contain the same data as that stored at the same address in the shared memory 32. The integrity of cache 12 will thus have been compromised.

In order to maintain the integrity of each cache in a situation such as described above, each shared memory is constructed and arranged to provide the input write address accompanying a processor write request along with an action signal J to each of the other monitoring and control circuits contained in the shared memory which do not correspond to the processor which initiated the write request. For example, in FIG. 1, a write request from processor 20 to the shared memory 32 will cause the accompanying write address and an action signal J to be applied to the monitoring and control circuitry 32a provided for processor 10.

Accordingly, refer again to the representative monitoring and control circuitry illustrated in FIG. 4. It will be understood that the action signal J shown applied to control logic 56, in effect, serves to apprise the monitoring and control circuitry in FIG. 4 that the applied block address (comprised of an index field and a key field) is a write address from a different processor other than the one to which the monitoring and control circuitry corresponds. Control logic 56 responds to this applied action signal J by providing a READ signal to the address table memory 50 which causes the pair of A and B keys stored at the address indicated by the index field of the input write address to be read out from the address table memory 50 and applied to hit logic 54 for comparison with the key field of the input write address. As shown in FIG. 4, the miss, hit A and hit B outputs of hit logic 54 are applied to control logic 56.

If the error output of hit logic 54 becomes "1" as a result of a hit being obtained for both A and B keys, then an error is indicated and appropriate corrective action is initiated. If the "1" miss output becomes "1", indicating that the addressed block is not in the respective cache, then control logic 56 is caused to take no action, since no updating is necessary. However, if a hit is indicated as a result of either hit A or hit B becoming "1", control logic 56 then operates in response thereto and also in response to a "1" value of J (indicating that the write request is from another processor) to cause a corresponding WRITE KEY A or WRITE KEY B activation signal to be applied to the address table memory 50 and a "1" D signal to be applied to the demultiplexer 62. As a result, the particular A key or B key of the key pair designated by the index field of the input write address will have an all zero value (or any other desired non-key value) written therein, thereby, in effect, purging this key value from the address table memory 50.

It will next be considered how provision is made for also purging a block in the respective cache when the block no longer corresponds to a block in the shared memory because of the shared memory block having been changed as a result of a write request from another processor. This purging of the appropriate cache block is accomplished using the D, $I_a$ and $I_b$ signals provided at the output of control logic 56 in FIG. 4 when a hit occurs and J is a "1" (indicating that the input address is from a different processor). It will be understood that the particular one of these $I_a$ and $I_b$ signals which will be "1" is determined by whether a hit is obtained for key A or key B. The shared memory is constructed and arranged to operate in response to a "1" value of D to cause these $I_a$ and $I_b$ along with the index field contained in the input address to be sent to the respective cache. It will be understood with reference to the cache implementation illustrated in FIG. 2 that the processor operates in response to $I_a$ and $I_b$ and the accompanying index field to cause either the WRITE $V_a$ or WRITE $V_b$ input of the cache memory 40 to be activated, depending upon which of $I_a$ or $I_b$ is "1". Also a "0" value is provided for the validation input V applied to demultiplexer 49 so as to thereby cause a "0" value to be written into the validation bit of the selected block of the data item addressed by the index field. This, in effect, purges (invalidates) the block in the cache corresponding to the block in the shared memory whose data was changed because of a write request of another processor.

It is to be understood that the present invention is subject to a wide variety of modifications and variations in construction, arrangement and use without departing from the scope of the invention. Accordingly, the present invention is to be considered as including all possible modifications and variations coming within the scope of the invention as defined by the appended claims.

What is claimed is:

1. In a data processing system, the combination comprising:
    a shared memory;
    a dedicated memory;
    a first requestor capable of selectively reading data from an address in either said shared memory or said dedicated memory, said first requestor including a cache having a fast access time and a smaller storage capacity relative to said shared and dedicated memories;
    said cache being responsive to the reading of data from either said shared memory or said dedicated memory by said first requestor for storing the data read out from said shared memory in a manner so as to provide for rapid accessing thereof by said first requestor;
    said first requestor being operable to selectably access data from said cache and also to selectively invalidate data in said cache; and
    a second requestor capable of writing into a shared memory address which is accessible by said first requestor;
    said shared memory including monitoring and control means responsive to a request by said second requestor which writes into a shared memory address which is also currently stored in said cache to signal said first requestor to invalidate the data in said cache corresponding to this shared memory address;
    said monitoring and control means including an updatable address table memory for storing a shared memory address in response to the transferring of the data at this shared memory address from said shared memory to said cache;
    said monitoring and control means also including means for accessing said address table memory in response to said second requestor writing into a shared memory address so as to determine whether the shared memory address written into by said second requestor is also stored in said cache.

2. The invention in accordance with claim 1, wherein said monitoring and control means removes a memory address from said address table memory when it corresponds to the same shared memory address which is written into by said second requestor.

3. The invention in accordance with claim 1, wherein both of said first and second requestors are capable of selectably reading data from and writing data into said shared memory, wherein said second requestor also includes a cache, wherein said second requestor and its cache are operable to perform the same functions as said first processor and its cache with respect to said shared memory, and wherein said shared memory includes a second monitoring and control means including a second updatable address table memory which provide for performing like operations with respect to said shared memory and said second requestor and its cache.

4. The invention in accordance with claim 1, 2 or 3, wherein said system includes an additional shared memory constructed and arranged in the same manner as the aforementioned shared memory and operating in a like manner with respect to said first and second requestors and their respective caches.

5. The invention in accordance with claim 3, wherein each requestor is a data processor.

6. The invention in accordance with claim 4, including a dedicated memory for said second requestor operating therewith in the same manner as the dedicated memory provided for said first requestor.

* * * * *

UNITED STATES PATENT AND TRADEMARK OFFICE
CERTIFICATE OF CORRECTION

PATENT NO. : 4,410,944

DATED : October 18, 1983

INVENTOR(S) : Reinhard K. Kronies

It is certified that error appears in the above-identified patent and that said Letters Patent is hereby corrected as shown below:

Col. 5, line 17, change "wich" to --which--.
Col. 6, line 18, change "a" to --the--.
Col. 7, line 4, delete "of", second occurrence.
Col. 8, line 55, after "$I_b$" insert --signals--.

Signed and Sealed this

Third Day of April 1984

[SEAL]

Attest:

Attesting Officer

GERALD J. MOSSINGHOFF

Commissioner of Patents and Trademarks